United States Patent

Honmou

[11] Patent Number: 5,563,969
[45] Date of Patent: Oct. 8, 1996

[54] APPARATUS AND METHOD FOR FORMING A HEMISPHERICAL MICROLENS AT THE END OF OPTICAL FIBER

[75] Inventor: Hiroshi Honmou, Tokyo, Japan

[73] Assignee: NEC Corporation, Tokyo, Japan

[21] Appl. No.: 437,329

[22] Filed: May 9, 1995

[30] Foreign Application Priority Data

May 23, 1994 [JP] Japan .................................. 6-107331
Apr. 4, 1995 [JP] Japan .................................. 7-078790

[51] Int. Cl.$^6$ .................................................. G02B 6/32
[52] U.S. Cl. ............................................ 385/35; 385/33
[58] Field of Search .............................. 385/33–35, 95, 385/96, 35.5

[56] References Cited

U.S. PATENT DOCUMENTS 4,804,395  2/1989  Clark et al. ...................................... 65/2
5,459,803  10/1995  Yamane et al. .......................... 385/33

FOREIGN PATENT DOCUMENTS 2-188707  7/1990  Japan .
2-205808  8/1990  Japan ...................................... 385/35
5-224098  9/1993  Japan .

OTHER PUBLICATIONS

"Formation of a Spherical Lens at Optical Fiber Ends with a Co2 laser", paek et al, Applied Optics, vol. 14, No. 2, pp. 294–298.

Primary Examiner—Rodney B. Bovernick
Assistant Examiner—Hemang Sunghavi
Attorney, Agent, or Firm—Sughrue, Mion, Zinn, Macpeak, & Seas

[57] ABSTRACT

The apparatus for forming a hemispherical micro-lens according to the present invention comprises a laser light oscillator 5 for irradiating laser light into one end 3a of an optical fiber 3, a far-field pattern (F.F.P.) detector 6 for detecting the shape of the F.F.P. of laser light emitted from the other end 3b of the optical fiber 3, discharge electrodes 1 for heating the end 3b of the optical fiber 3 and thereby forming a hemispherical microlens, and a discharge controller 2 for controlling the operation of the discharge electrodes 1 according to the shape of the detected F.F.P. With this apparatus, laser light is irradiated into one end surface 3a of an optical fiber 3, the other end surface 3b is heated to form a hemispherical microlens while measuring the F.F.P. of laser light emitted from this end surface 3b, and heating is halted according to the measured value of the F.F.P. It is preferable that the discharge controller 2 halt the heating operation when the diameter of the F.F.P. detected at the F.F.P. detector is approximately equal to a preset value, in particular the maximum value of the diameter of the F.F.P. This apparatus may also be applied in a case in which the ends 3b of a plurality of optical fibers arranged as an array are collectively heated and formed into hemispherical microlenses.

16 Claims, 3 Drawing Sheets

APPARATUS AND METHOD FOR FORMING A HEMISPHERICAL MICROLENS AT THE END OF OPTICAL FIBER

BACKGROUND OF THE INVENTION

1. Field of the Invention

The present invention relates to an apparatus and method for forming a hemispherical microlens at the end of an optical fiber used for optical communication for the purpose of efficient optocoupling of an optical element and optical fiber.

2. Description of the Related Art

One known technique for efficiently optocoupling an optical fiber and an optical element involves forming the core portion of the end of an optical fiber as a hemisphere, and using the image magnification effected by the lens action of the curved surface to highly efficiently optocouple an optical element and optical fiber.

The method of forming the end of the optical fiber as a hemisphere, i.e., the hemispherical microlens forming method, involves first grinding the end of the optical fiber flat, heating and melting the end using a burner or electrical discharge heating, and forming a hemispherical shape by means of the surface tension of the melted fiber.

A hemispherical microlens forming method for forming only the core portion of an optical fiber as a hemisphere is disclosed in the author's patent application Japanese Patent Laid-open No. 224098/1993. In this method, the core portion of an optical fiber is caused, to protrude by etching the end surface of the fiber. The core portion is then heated, thereby forming the protruding core-as a hemisphere. In particular, this method enables a reduction of manufacturing costs when forming as hemispherical microlenses the ends of an optical fiber array, each to be optocoupled to an optical element of a plurality of arranged optical elements, because the hemispherical microlens forming method can be applied to the tip surfaces collectively of the plurality of optical fibers arranged as an array.

The hemispherical shape of the protruding core changes with the passage of heating time. According to the conventional method of determining heating time, an operator observes the tip shape while heating the fiber end and stops heating upon judging that the ideal shape has been achieved.

However, precise monitoring of the shape by the operator is complicated by the extremely small diameter of the hemispherical tip of the core, which is on the order of 10 micron. The resulting error in heating time causes disparity in the shape of the hemispherical tips of each optical fiber. This results in the disadvantage that there is variation in the optocoupling characteristic for the optical fibers and optical elements and a corresponding increase in optocoupling loss.

With the object of canceling this disparity in optocoupling characteristic between the optical fibers and optical elements, Japanese Patent Laid-open No. 188707/1990 discloses a scheme in which, as shown in FIG. 1, light is irradiated into one end of an optical fiber 3, the light emitted from the opposite end is cast upon a translucent screen 7, the change in the shape of the field pattern during heating is observed from the reverse side of this screen 7, and heating is stopped when the field pattern reaches a minimum size.

However, as shown in FIG. 2, due to the lens effect of the hemispherical tip, laser light emitted from the hemispherical core tip at the end surface of an optical fiber generally first converges and then diverges, spreading apart with distance. If the radius of curvature of the surface of the hemispherical tip of the optical fiber is small, the refractive effect of the lens increases and the far-field pattern (hereinafter abbreviated as "F.F.P.") grows. On the other hand, if the radius of curvature of the surface of the hemispherical tip is small, the image magnification increases, and as a result, the optocoupling loss between the optical fibers and optical elements diminishes. In other words, when the diameter of the irradiated pattern approximates a maximum, optocoupling loss is at a minimum.

The improvement shown by FIG. 1 means that, if it is assumed that the vicinity of the focal point of the lens formed by the hemispherical tip is the position at which the field pattern is smallest, the screen is positioned extremely close to the hemispherical tip of the optical fiber and variation is observed in the near-field pattern (hereinafter abbreviated as "N.F.P.") which is about the same size as the core diameter.

Accordingly, the size of the observed field pattern is at most approximately 1 mm, and the smallest point within its variation must be found to determine the time for stopping heating.

SUMMARY OF THE INVENTION

The object of the present invention is to provide an apparatus and method of forming a hemispherical microlens at the end of an optical fiber which solves the above-described problems, reduces the optocoupling loss between optical fibers and optical elements, and moreover, enables reliable forming of an optical fiber end.

To achieve this object, the apparatus for forming a hemispherical microlens at the end 3b of optical fiber according to the present invention comprises laser light irradiation means 4, 5 for irradiating laser light into one end 3a of an optical fiber 3, F.F.P. detection means 6 for detecting the shape of the F.F.P. of the laser light emitted from the other end 3b of the optical fiber, heating means 1 for heating the other end 3b of the optical fiber and forming a hemispherical microlens, and heating control means 2 for controlling the operation of the heating means 1 according to the shape of the detected F.F.P.

In addition, it is preferable that the heating control means 2 stop heating by the heating means 1 when it detects that the F.F.P. diameter detected by the F.F.P. detection means 6 has reached a preset value.

It is further preferable that the preset value for comparison with the diameter of the F.F.P. be the maximum value of the diameter of the F.F.P.

The heating means 1 may also collectively heat and form hemispherical microlenses at the ends 3b of a plurality of optical fibers disposed as an array.

In the method of forming a hemispherical microlens at the end 3b of an optical fiber 3 according to the present invention, laser light is irradiated into one end 3a of an optical fiber, the F.F.P. of the laser light emitted from the opposite end 3b is detected while the opposite end 3b of the optical fiber is being heated and a hemispherical microlens being thereby formed, and the cessation of heating is controlled according to the shape of the detected F.F.P.

It is preferable that the diameter of the F.F.P. of the laser light be compared with a prescribed value, and that heating be stopped when the diameter is approximately equal to the prescribed value.

It is further preferable that the prescribed value be the maximum value of the diameter of the F.F.P.

The above-described means and method enable formation of a hemispherical microlens at the end of optical fiber having a stable characteristic when optocoupled with an optical element. In particular, by stopping heating when the diameter of the F.F.P. reaches the vicinity of a maximum value, the optocoupling loss between the optical fiber and optical element can be restricted to a minimum.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENTS

Figure 3:
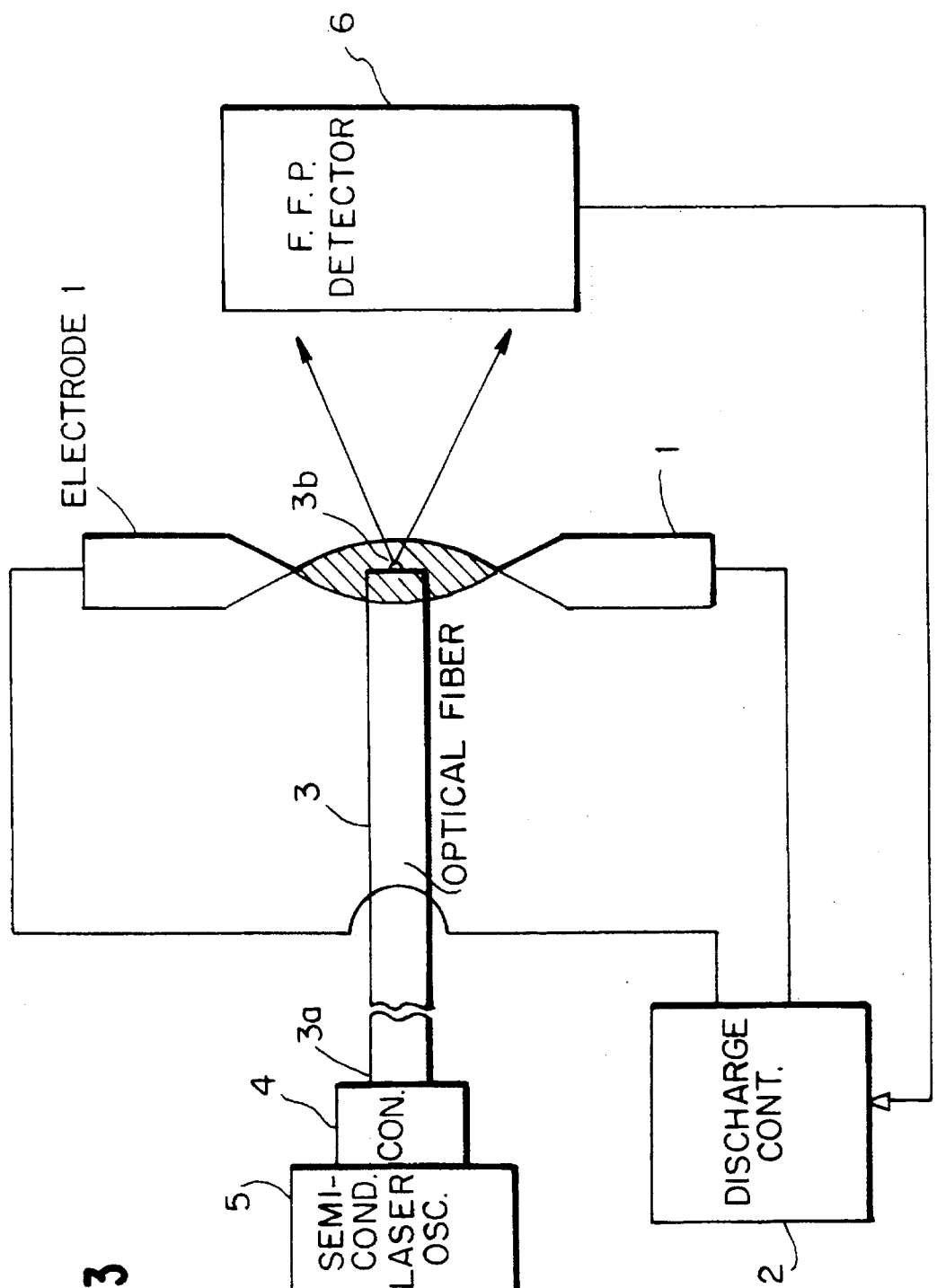
FIG. 3 shows a block diagram of a first embodiment of an apparatus for forming a hemispherical microlens at the end of an optical fiber according to the present invention.

As shown in FIG. 3, an apparatus for forming a hemispherical microlens according to the present invention comprises a pair of electrodes 1 which are the heating means of the optical fiber 3 which is to be formed as a hemispherical microlens; an electrical discharge controller 2 which is the heating control means; a light connector 4 and a semiconductor laser oscillator 5 which are the laser light irradiation means; and an F.F.P. detector 6 which is the F.F.P. detection means.

The pair of electrodes 1, both of which have an outside diameter of 2 mm φ, are arranged to oppose each other over a 5 mm gap and are connected to the discharge controller 2. Following etching, the end surface 3b of the protruding core of the optical fiber 3 is disposed approximately midway between the pair of electrodes 1 and heated by the discharge occurring between the electrodes 1. The other end surface 3a of the optical fiber 3 is connected by way of the optical connector 4 to the semiconductor laser oscillator 5, which generates a wavelength of 1.3 μm, thereby irradiating laser light into the optical fiber 3. This laser light is emitted from the end surface 3b of the optical fiber 3 having the protruding core, and the F.F.P. diameter is measured by means of the F.F.P. detector 6 mounted about 10 cm from the end surface 3b. If the F.F.P. detector 6 is, for example, the Hamamatsu Photonics (Corp.) F.F.P. detector, the F.F.P. of the emitted laser light undergoes image recognition, and from this picture signal, as shown at the upper right of FIG. 4, a value φ of the full width at half maximum (hereinafter abbreviated as "FWHM") of the F.F.P. is outputted as the F.F.P. diameter. The F.F.P. diameter φ signal outputted from the F.F.P. detector 6 is inputted to the discharge controller 2. Following commencement of discharge between the electrodes 1, when the F.F.P. diameter value φ outputted from the F.F.P. detector 6 approaches the preset maximum value of the diameter of the F.F.P., i.e., when between $t_1$ and $t_2$ of FIG. 4, the discharge controller 2 causes the discharge between the electrodes to cease.

Figure 1:
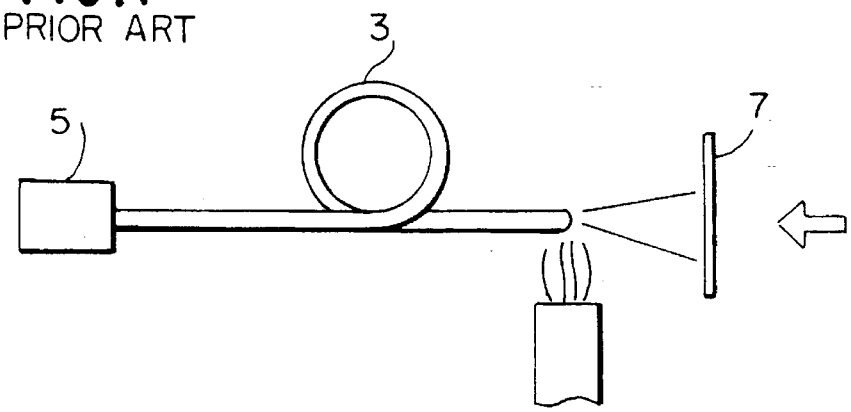
FIG. 1 shows a block diagram of an embodiment of an apparatus of the prior art for forming a hemispherical microlens at the end of optical fiber.
Figure 2A:
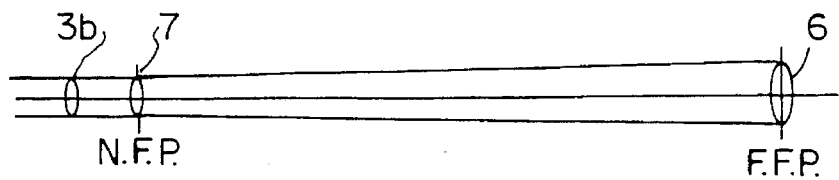
FIG. 2 shows variation in the field pattern over distance from the end of the optical fiber due to differences in refractive index of the lens.
Figure 2B:
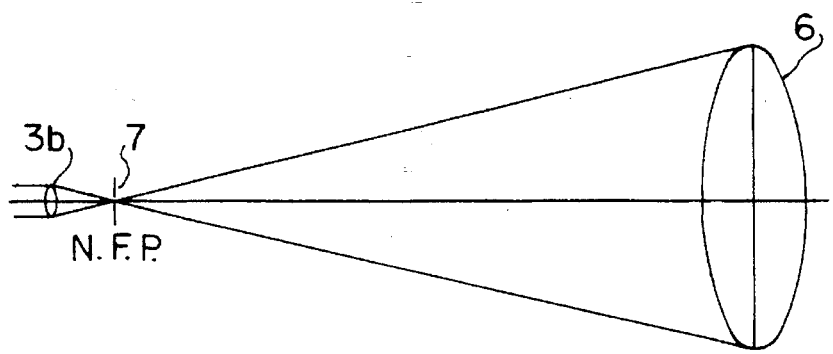
Figure 2C:
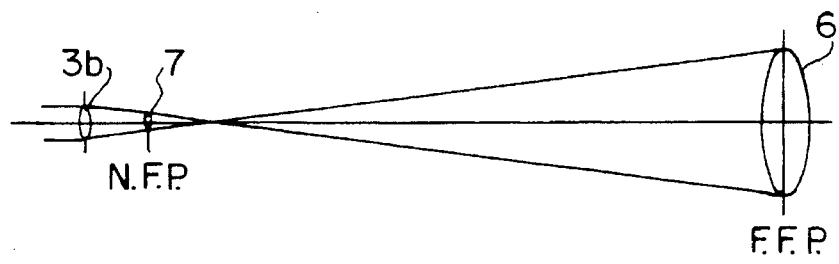
Figure 4B:
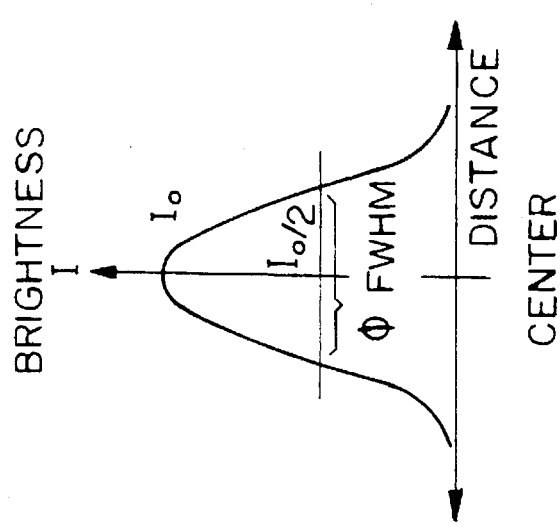
FIG. 4 shows the relation between the length of heating time and the diameter of the field pattern.
Figure 4A:
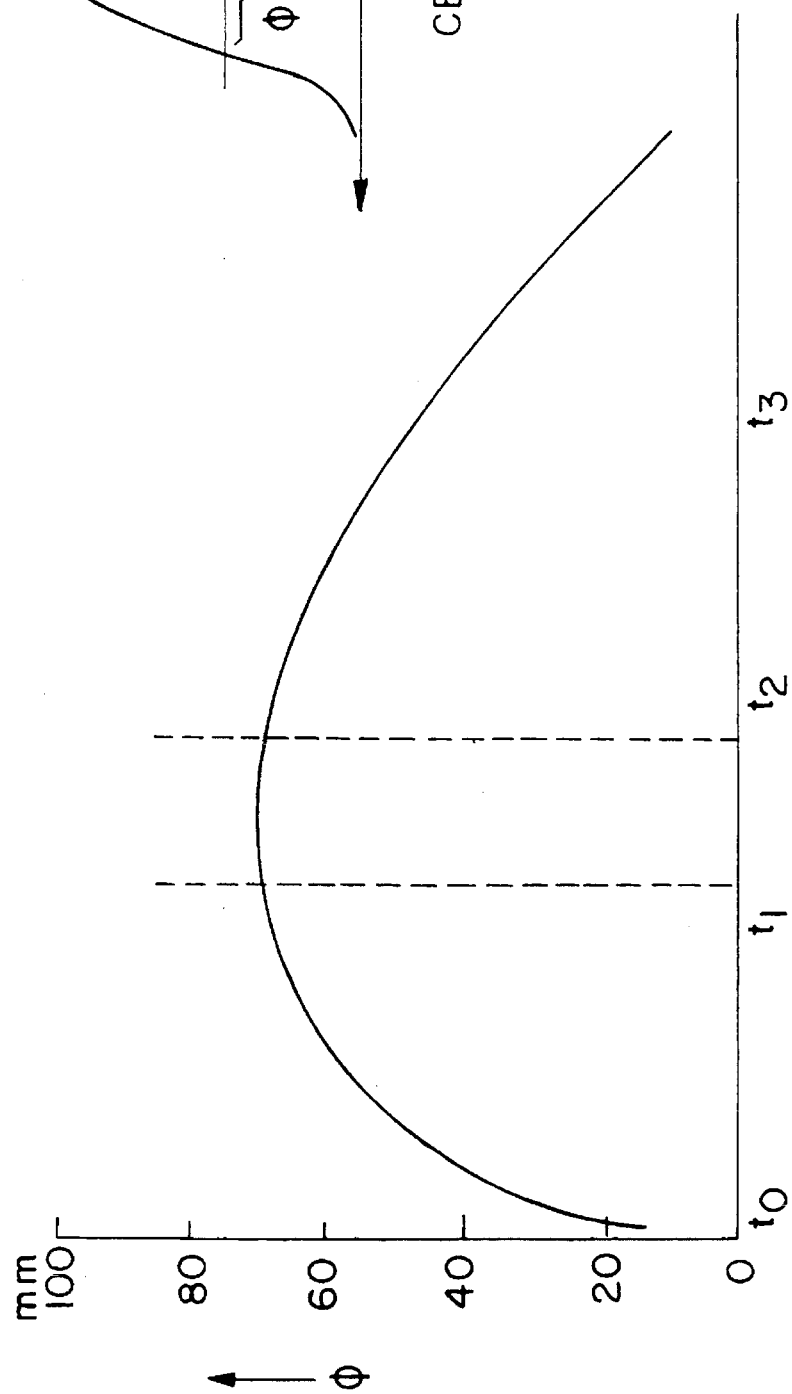

Normally, at $t_0$ of FIG. 4 and before heating, the core caused to protrude by etching from the end surface of the optical fiber is approximately cylindrical in shape and its tip surface is flat, and therefore, the radius of curvature is great. Consequently, the F.F.P. diameter of the emitted laser light is relatively small, as shown in the upper portion of FIG. 2, and the coupling loss with an optical element is great. When the protruding core is heated, the radius of curvature of the core surface of the core becomes smaller, and the shape of the end of the core gradually becomes hemispherical, thereby making the coupling loss smaller. In this case, the diameter of the F.F.P. becomes large, as shown in the middle portion of FIG. 2. As heating is further continued to $t_3$, the core flattens and radius of curvature of the end surface again becomes large, causing the diameter of the F.F.P. diameter to become small as shown in the lower portion of FIG. 2, and the coupling loss to increase. Accordingly, the coupling loss reaches a minimum when the diameter of the F.F.P. approaches its maximum value. FIG. 4 plots the change in field pattern diameter (FWHM) at a position 10 cm away from the light-emitting end of the optical fiber with the passage of heating time.

In the present embodiment, determination that the F.F.P. diameter value has reached the vicinity of the maximum value is carried out as follows:

Essentially, an F.F.P. diameter is first found that is in the vicinity of a maximum value by calculation beforehand or by actual measurement. When the F.F.P. diameter value φ outputted by the F.F.P. detector 6 reaches the vicinity of this maximum value, it is determined that the F.F.P. diameter has reached its maximum, and the discharge between the electrodes 1 is stopped.

Alternatively, if a maximum value for the F.F.P. diameter cannot be preset, change in the F.F.P. diameter φ outputted from the F.F.P. detector 6 may be continuously monitored following commencement of discharge between the electrodes 1, and when this value begins to exhibit any decrease following a gradual increase, it can be determined that the F.F.P. diameter has reached the vicinity of the maximum value, and discharge between the electrodes can be stopped.

In the present embodiment, because the time that heating is halted of the end of the optical fiber is controlled through measurement of the diameter of the F.F.P., heating can be halted at the optimum point in time, and the optimum duration of heating can be determined. Accordingly, variance in the hemispherical shape of the core tip can be prevented and variance in the optocoupling characteristic between an optical element and optical fiber can be eliminated. In the case of the present embodiment, excellent results were obtained for the measured variance between each optical fiber in terms optocoupling loss with a semiconductor laser, maximum variance being just 0.4 dB.

Although in the first embodiment discharge is halted when the F.F.P. diameter reaches the vicinity of a maximum, the time of halting discharge in the present invention is not limited to only the time that the F.F.P. reaches the vicinity of a maximum. For example, with the object of relaxing the tolerance for error in the positioning of an optical fiber, an appropriate value may be set that is between the maximum and minimum F.F.P. diameters, and discharge may be halted when the F.F.P. reaches this set value. In this case, optocoupling loss may increase slightly, but the tolerance for positioning error can be relaxed.

In addition, while single-mode optical fiber is used in the first embodiment, the present invention is not limited to the use of single-mode optical fiber, and a similar effect can be obtained for graded index multimode optical fiber having a core dopant density within the distribution of the graded index type.

The optical fiber is also not limited to a single optical fiber, a multichannel optical fiber array also being possible. In this case, hemispherical microlenses can be collectively formed at the ends the optical fibers of a multichannel array by collectively heating the core ends of the plurality of optical fibers disposed in the array while monitoring the F.F.P. cast by laser light irradiated into one optical fiber among the plurality of optical fibers, and halting heating when the F.F.P. diameter reaches a maximum value or a preset value.

The present invention can also be applied to forming a hemispherical microlens at the end surface of an entire optical fiber by heating the surface of an optical fiber from which the core has not been caused to protrude, i.e., the flat end surface of an entire optical fiber including the core and cladding.

Moreover, a human operator can take part in judging the timing of heating and halting heating of the optical fiber if the F.F.P. diameter is displayed on an F.F.P. measurement device.

Finally, the heat source for heating the end surface of an optical fiber is not limited to the electrical discharge effect. For example, the present invention may also be applied in cases where the heat source is laser light or an electric furnace.

It is to be understood, however, that variations and modifications of the apparatus and the method disclosed herein will be evident to those skilled in the art. It is intended that all such modifications and variations be included within the scope of the appended claims.

What is claimed is:

1. An apparatus for forming a hemispherical microlens at an end of an optical fiber comprising:

laser light irradiation means for irradiating laser light into one end of an optical fiber;

far-field pattern detection means for detecting the shape of a far-field pattern of laser light emitted from the other end of said optical fiber;

heating means for heating said other end of said optical fiber and forming a hemispherical microlens; and heating control means for controlling the operation of said heating means according to the shape of said detected far-field pattern.

2. An apparatus for forming a hemispherical microlens at the end of an optical fiber according to claim 1 wherein said heating control means halts the heating operation of said heating means when it detects that the diameter of a far-field pattern detected by said far-field pattern detection means has reached a preset value.

3. An apparatus for forming a hemispherical microlens at the end of an optical fiber according to claim 2 wherein the preset value for comparison with the diameter of the far-field pattern is a maximum value of the diameter of the far-field pattern.

4. An apparatus for forming a hemispherical microlens at the end of an optical fiber according to claim 2 wherein said heating means collectively heats and forms respective hemispherical microlenses at an end of each of a plurality of optical fibers disposed as an array.

5. An apparatus for forming a hemispherical microlens at the end of an optical fiber according to claim 4 wherein the heating control means controls the heating operation of said plurality of optical fibers according to a far-field pattern cast by laser light irradiated into one end of one optical fiber among the plurality of optical fibers.

6. An apparatus for forming a hemispherical microlens at the end of an optical fiber according to claim 1 wherein said heating control means halts the heating operation of said heating means when said control means detects that the diameter of the far-field pattern detected by said far-field pattern detection means begins to exhibit any decrease.

7. An apparatus for forming a hemispherical microlens at the end of an optical fiber according to claim 1 wherein said optical fiber is any one of a single-mode optical fiber and a graded index multimode optical fiber having a core dopant density within a distribution of a graded index type.

8. An apparatus for forming a hemispherical microlens at the end of an optical fiber according to claim 1 wherein said heating means is any one of a laser light, a plurality of electrodes, and an electric furnace.

9. An apparatus for forming a hemispherical microlens at the end of an optical fiber according to claim 1 wherein a flat end surface, including both a core and a cladding, of said optical fiber is heated.

10. A method of forming a hemispherical microlens at an end of an optical fiber comprising:

irradiating laser light into one end of an optical fiber;

forming a hemispherical microlens by heating an opposite end of said optical fiber;

detecting, while said hemispherical microlens is being formed, a far-field pattern of laser light emitted from said opposite end; and controlling a halting of said heating operation based on the shape of said detected far-field pattern.

11. A method for forming a hemispherical microlens at the end of an optical fiber according to claim 10 wherein the diameter of the far-field pattern of laser light is compared with a prescribed value and said heating operation is halted when it is detected that said diameter is approximately equal to said prescribed value.

12. A method for forming a hemispherical microlens at the end of an optical fiber according to claim 10 wherein the prescribed value is the maximum value of the diameter of the far-field pattern.

13. A method for forming a hemispherical microlens at the end of an optical fiber according to claim 10 whereby an end of each of a plurality of optical fibers disposed as an array are collectively heated and formed into respective hemispherical microlenses.

14. A method for forming a hemispherical microlens at the end of an optical fiber according, to claim 13 whereby a heating operation of a plurality of optical fibers is controlled according to a far-field pattern cast by laser light irradiated into one end of one optical fiber among the plurality of optical fibers.

15. A method for forming a hemispherical microlens at the end of an optical fiber according to claim 10 wherein said heating operation is halted when the diameter of the far-field pattern of laser light begins to exhibit any decrease.

16. A method for forming a hemispherical microlens at the end of an optical fiber according to claim 10 wherein a flat end, surface, including both a core and a cladding, of said optical fiber is heated.

\* \* \* \* \*